United States Patent
Jung et al.

(10) Patent No.: US 7,441,089 B2
(45) Date of Patent: Oct. 21, 2008

(54) PRESERVING CONTENT OF SERIAL USE DEVICES IN VIEW OF PURGE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 343 days.

(21) Appl. No.: 10/973,930

(22) Filed: Oct. 25, 2004

(65) Prior Publication Data

US 2006/0090037 A1    Apr. 27, 2006

(51) Int. Cl.
*G06F 12/00* (2006.01)
(52) U.S. Cl. .................... 711/159; 384/211.4
(58) Field of Classification Search .................. 711/159
See application file for complete search history.

(56) References Cited

U.S. PATENT DOCUMENTS

| | | | |
|---|---|---|---|
| 5,423,086 A | 6/1995 | Cannon et al. | |
| 5,537,558 A | 7/1996 | Fletcher et al. | |
| 5,812,641 A * | 9/1998 | Kanoh et al. | 379/91.02 |
| 5,878,282 A | 3/1999 | Mital | |
| 5,889,816 A | 3/1999 | Agrawal et al. | |
| 5,978,591 A | 11/1999 | Bartholomew et al. | |
| 6,189,056 B1 | 2/2001 | Ogura et al. | |
| 6,202,209 B1 | 3/2001 | Bartholomew et al. | |
| 6,310,634 B1 | 10/2001 | Bodnar et al. | |
| 6,356,583 B1 | 3/2002 | Lee | |
| 6,687,743 B1 * | 2/2004 | Innes | 709/206 |
| 6,754,765 B1 | 6/2004 | Chang et al. | |
| 7,170,259 B2 * | 1/2007 | Veselic | 320/114 |
| 2001/0012060 A1 * | 8/2001 | Wakui | 348/211 |
| 2003/0048358 A1 * | 3/2003 | Shirai | 348/207.1 |
| 2004/0006517 A1 | 1/2004 | Takatori | |
| 2005/0124332 A1 * | 6/2005 | Clark et al. | 455/419 |
| 2006/0072755 A1 * | 4/2006 | Oskari | 380/270 |

OTHER PUBLICATIONS

"Optical Fiber", Microsoft Computer Dictionary, Fifth edition; Microsoft Press; Redmond, Washington; p. 379 (total of 3 pages—including cover and publication pages) bearing a date of 2002.
PCT International Search Report; International App. No. PCT/US05/38838; Jan. 31, 2007.
PCT International Search Report; International App. No.: PCT/US05/38496; pp. 1-3; Jun. 25, 2008.

* cited by examiner

*Primary Examiner*—Kevin Ellis
*Assistant Examiner*—Hashem Farrokh

(57) ABSTRACT

Methods and systems for preserving content of serial use devices in view of a purge are presented. A method for preserving content of a serial use device in view of a purge may comprise: detecting a likelihood that a purge of a memory of a serial-use device is forthcoming; and transmitting a content of the memory of the serial-use device in response to said detecting. A system for preserving content of a serial use device in view of a purge may comprise: means for detecting a likelihood that a purge of a memory of a serial-use device is forthcoming; and means for transmitting a content of the memory of the serial-use device in response to said detecting.

31 Claims, 13 Drawing Sheets

FIG. 7
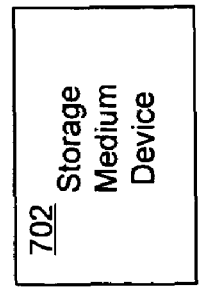
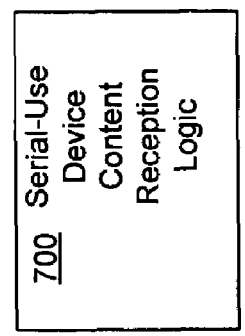
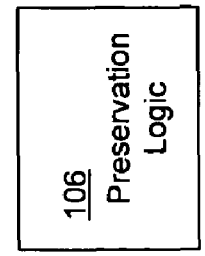

FIG. 11
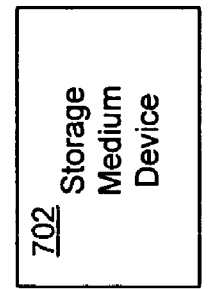
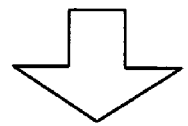
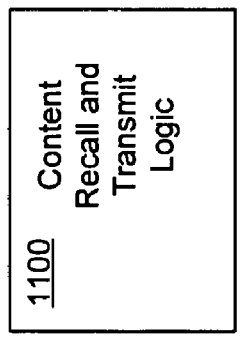
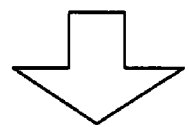
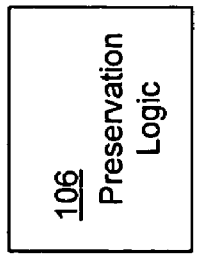

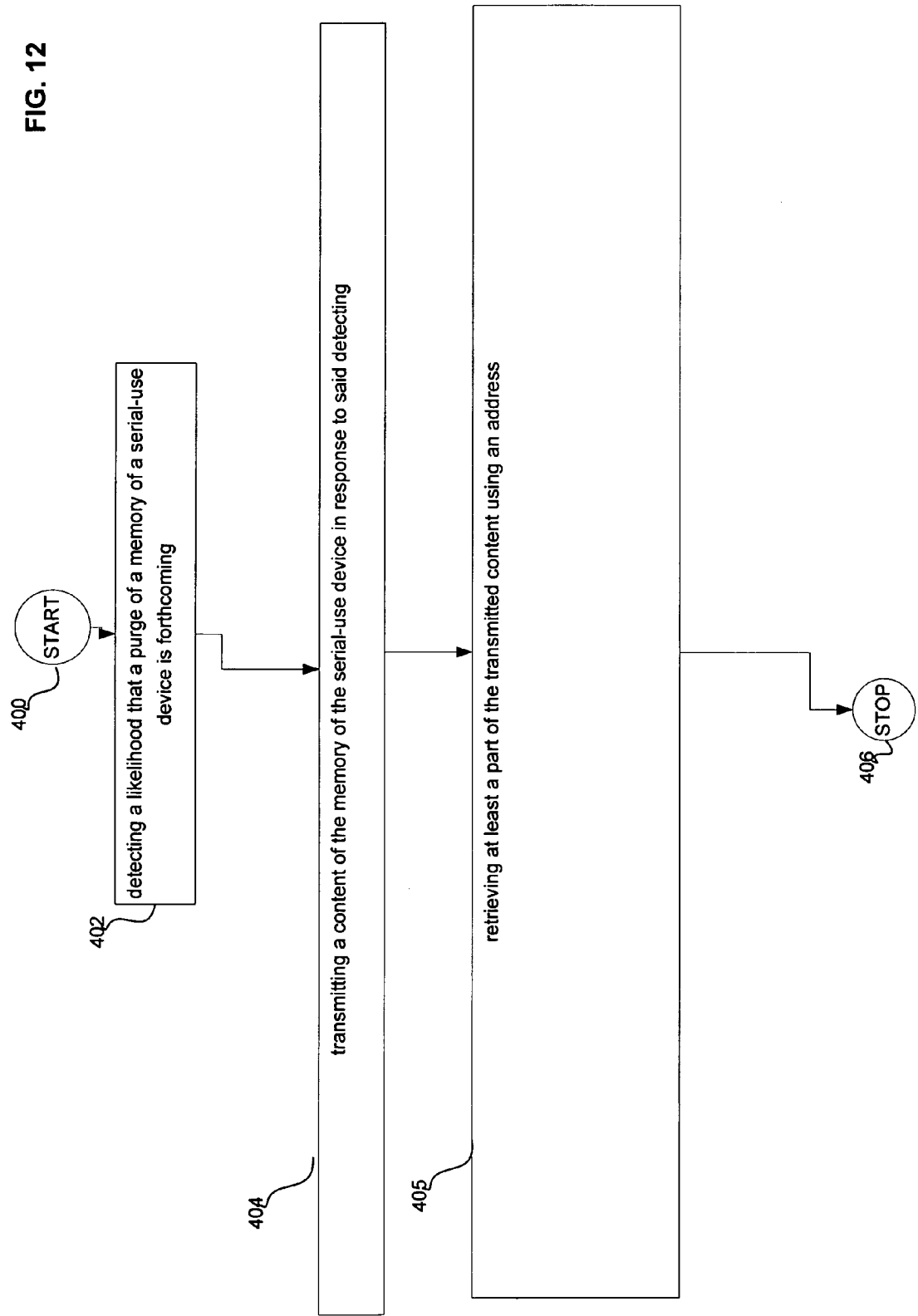

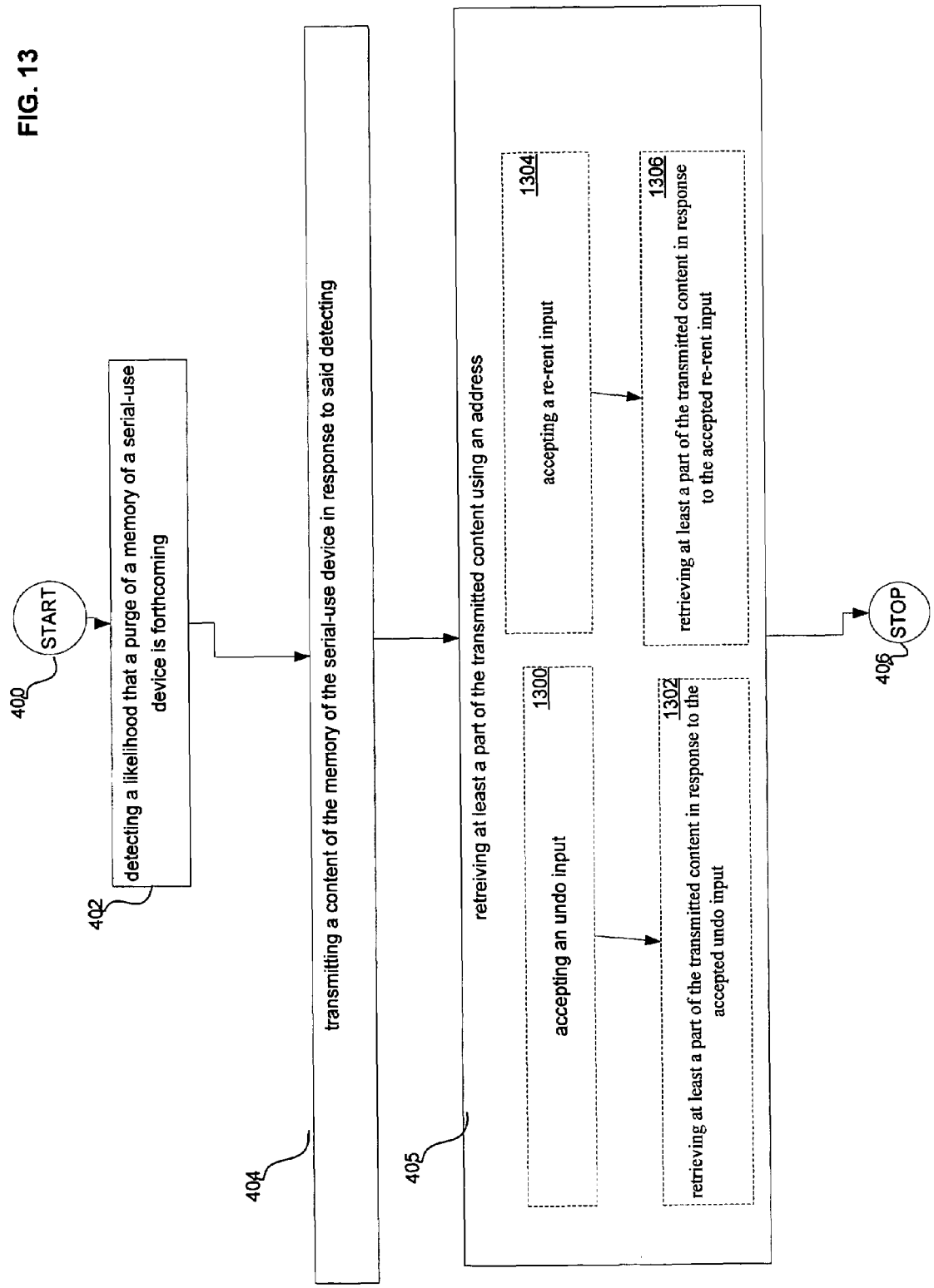

US 7,441,089 B2

PRESERVING CONTENT OF SERIAL USE DEVICES IN VIEW OF PURGE

TECHNICAL FIELD

The present application relates, in general, to devices having purging mechanisms.

SUMMARY

In one aspect, a method includes but is not limited to detecting a likelihood that a purge of a memory of a serial-use device is forthcoming; and transmitting a content of the memory of the serial-use device in response to said detecting. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to circuitry for detecting a likelihood that a purge of a memory of a serial-use device is forthcoming; and circuitry for transmitting a content of the memory of the serial-use device in response to said detecting. In addition to the foregoing, other system aspects are described in the claims, drawings, and text forming a part of the present application.

In one aspect, a system includes but is not limited to a serial-use device operably couplable with upcoming-purge detection logic; and preservation logic operably-couplable with a memory device of said serial-use device. In addition to the foregoing, other system aspects are described in the claims, drawings, and text forming a part of the present application.

In one aspect, a method includes but is not limited to receiving a content of a memory of a serial-use device transmitted in response to a detection of a likelihood of a purge of the memory of the serial-use device; and storing the content of the memory of the serial-use device. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to circuitry for receiving a content of a memory of a serial-use device transmitted in response to a detection of a likelihood of a purge of the memory of the serial-use device; and circuitry for storing the content of the memory of the serial-use device. In addition to the foregoing, other system aspects are described in the claims, drawings, and text forming a part of the present application.

In one aspect, a system includes but is not limited to a serial-use device content reception logic operably couplable with preservation logic; and a storage medium device operably-couplable with said serial-use device content reception logic. In addition to the foregoing, other system aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

BRIEF DESCRIPTION OF THE FIGURES

FIG. 7 illustrates a high-level block diagram of one implementation of preservation logic 106 transmitting all or part of a content of memory device logic 104 to serial-use device content reception logic 700.

FIG. 11 illustrates a high-level block diagram of one implementation of preservation logic 106 retrieving all or part of a content of memory device logic 104 from storage medium device 702 through content recall and transmit logic 1100.

FIG. 12 shows a high-level logic flowchart illustrating at least one alternate implementation of the high-level logic flowchart of FIG. 4.

FIG. 13 depicts a high-level logic flowchart illustrating alternate implementations of the high-level logic flowchart of FIG. 12.

The use of the same symbols in different drawings typically indicates similar or identical items.

DETAILED DESCRIPTION

Figure 1:
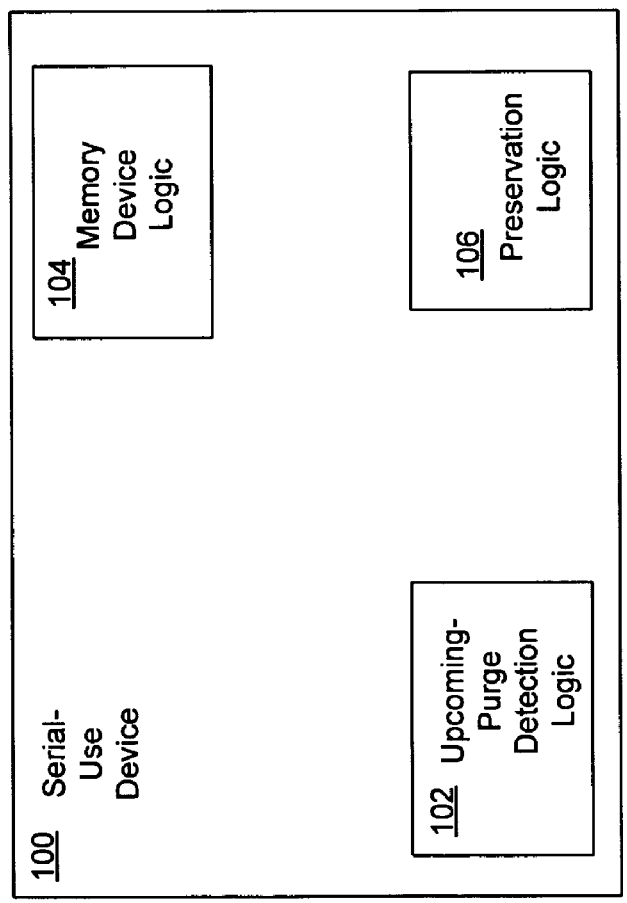
FIG. 1 shows a high-level block diagram of one implementation of serial-use device 100.

With reference to the figures, and with reference now to FIG. 1 shown is a high-level block diagram of one implementation of serial-use device 100. Depicted is that serial-use device 100 contains memory device logic 104, upcoming-purge detection logic 102, and preservation logic 106. In one implementation upcoming-purge detection logic 102, memory device logic 104, and preservation logic 106 are at least partially formed from integrated circuits and are electrically interconnected (e.g., via conductors such as wires).

Those skilled in the art will recognize that while, in some implementations, a serial-use device may involve a series having more than one use, in other implementations the serial-use device may involve a series having only one use. In other words, as used herein the term "serial-use device" can encompass both a multiple-use as well as a single use device, in that a series can consist of one and/or more than one element. The inventors point out that serial-use device 100 can entail a still image device (e.g., a digital still camera and/or playback device), a motion image device (e.g., a digital video camera and/or a playback device), a textual data device (e.g., a book recordation and/or playback device), and/or an audio recordation device.

Figure 2:
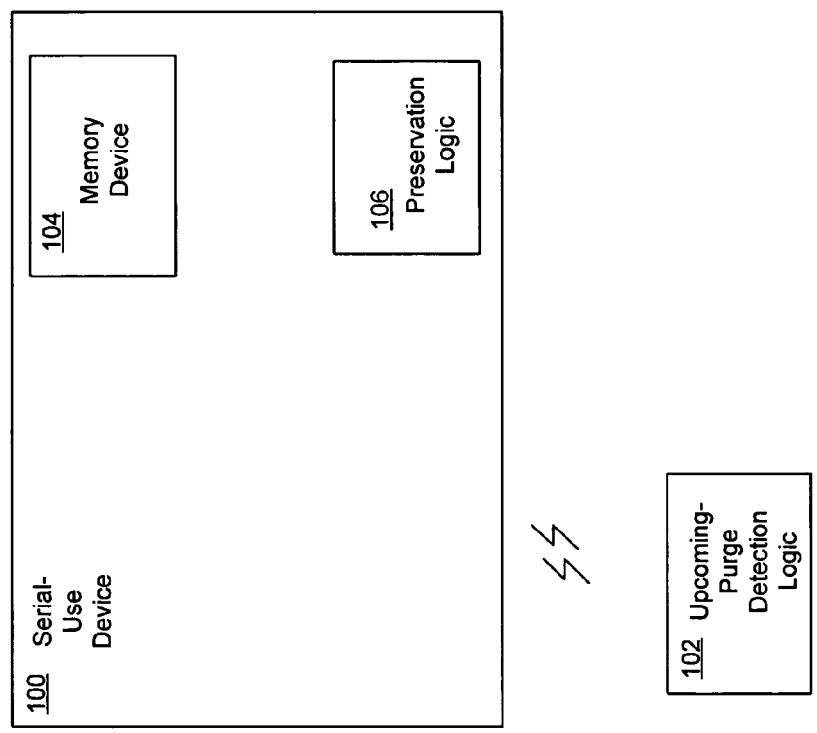
FIG. 2 depicts a high-level block diagram of another implementation of serial-use device 100.

Referring now to FIG. 2, depicted is a high-level block diagram of another implementation of serial-use device 100. In the implementation depicted, upcoming-purge detection logic 102 is no longer resident within serial-use device 100, but is instead located at a position remote from serial-use device 100. For example, at a rental camera stand, such as might be utilized in an implementation where serial-use device 100 entails a digital camera (e.g., still or motion). Illustrated is that serial-use device 100 and upcoming-purge detection logic 102 are communicating via information exchanged across a distance. In one implementation such information can be exchanged wirelessly (e.g., via electromagnetic radiation in substantially any portion of the electromagnetic spectrum). In another implementation such information can be exchanged optically (e.g. via electromagnetic radiation in the optical spectrum).

Figure 3:
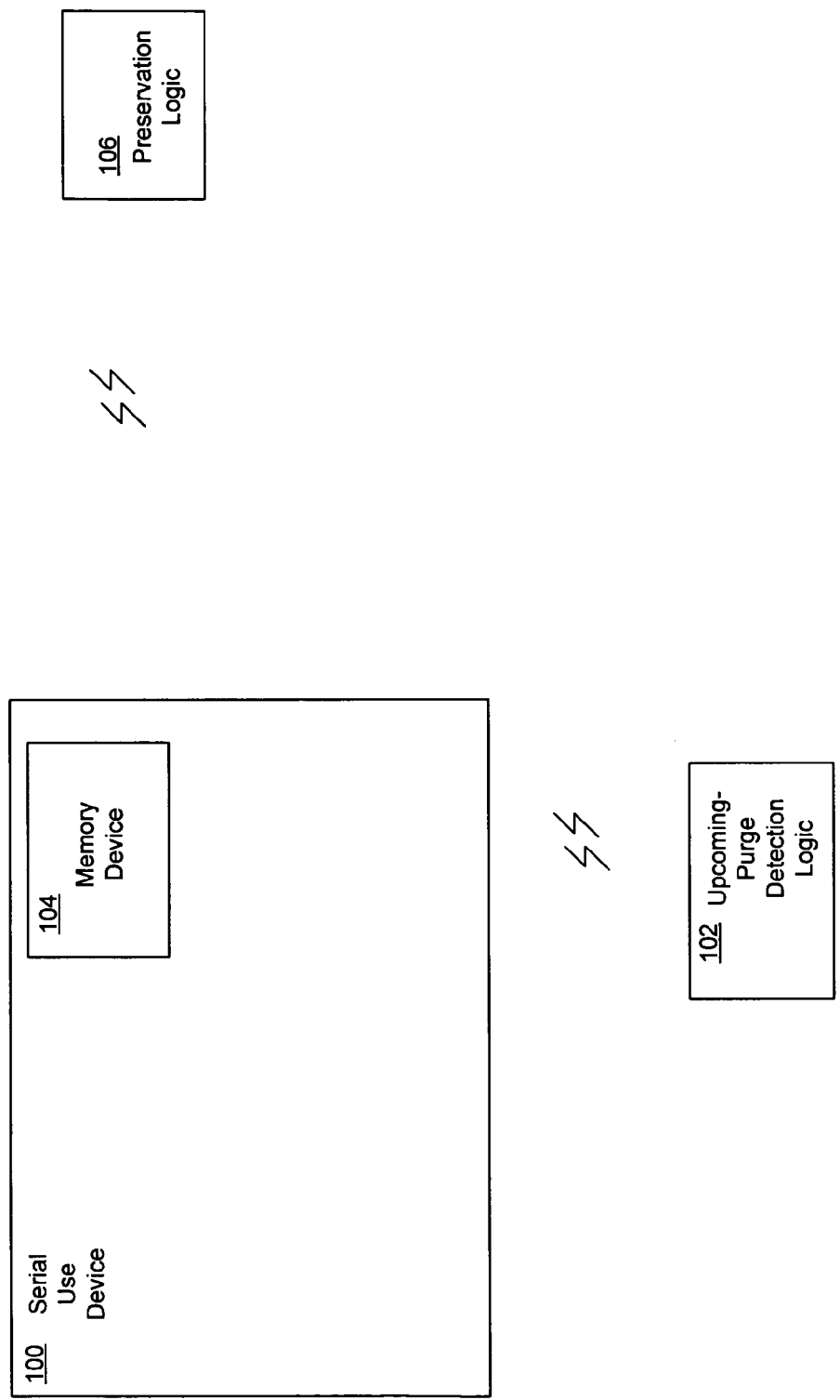
FIG. 3 illustrates a high-level block diagram of another implementation of serial-use device 100.

With reference now to FIG. 3, illustrated is a high-level block diagram of another implementation of serial-use device 100. In the implementation shown, both upcoming-purge detection logic 102 and preservation logic 106 are located at positions remote from serial-use device 100. For example, at a rental stand, such as might be utilized in an implementation where serial-use device 100 entails a computing device (e.g., a personal digital assistant (PDA), a blackberry, and/or or a cell phone). Illustrated is that serial-use device 100 and upcoming-purge detection logic 102, and preservation logic 106 are communicating via information exchanged across a distance. In one implementation such information can be exchanged wirelessly (e.g., via electromagnetic radiation in substantially any portion of the electromagnetic spectrum). In another implementation such information can be exchanged optically (e.g., via electromagnetic radiation in the optical spectrum).

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 4:
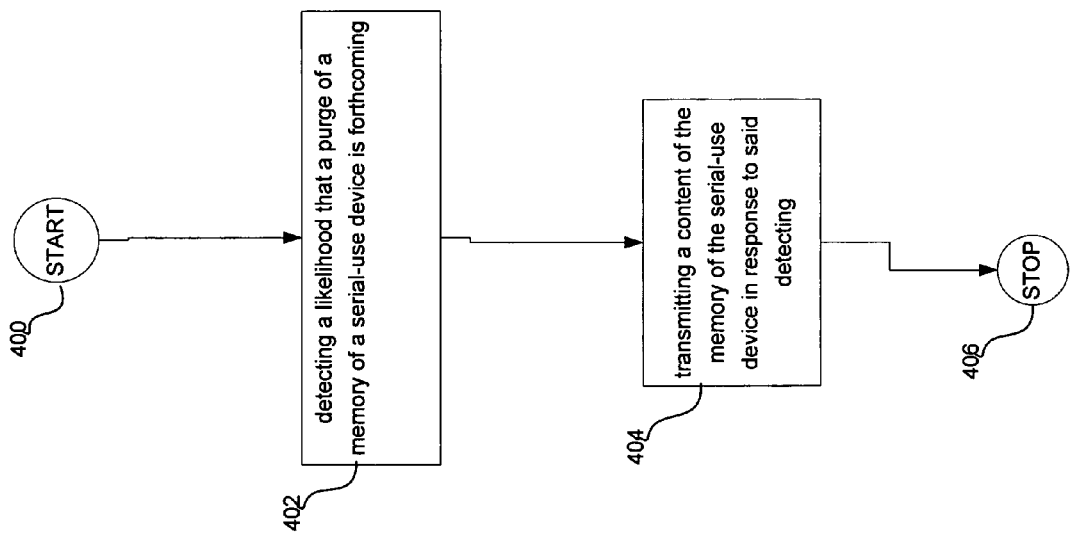
FIG. 4 illustrates a high-level logic flowchart of a process.

Referring now to FIG. 4, illustrated is a high-level logic flowchart of a process. Method step 400 shows the start of the process. Method step 402 shows detecting a likelihood that a purge of a memory of a serial-use device is forthcoming (e.g., via upcoming-purge detection logic 102 and/or its supporting components). Method step 404 depicts transmitting a content of the memory of the serial-use device in response to said detecting (e.g., via preservation logic 106). Method step 406 shows the end of the process.

Figure 5:
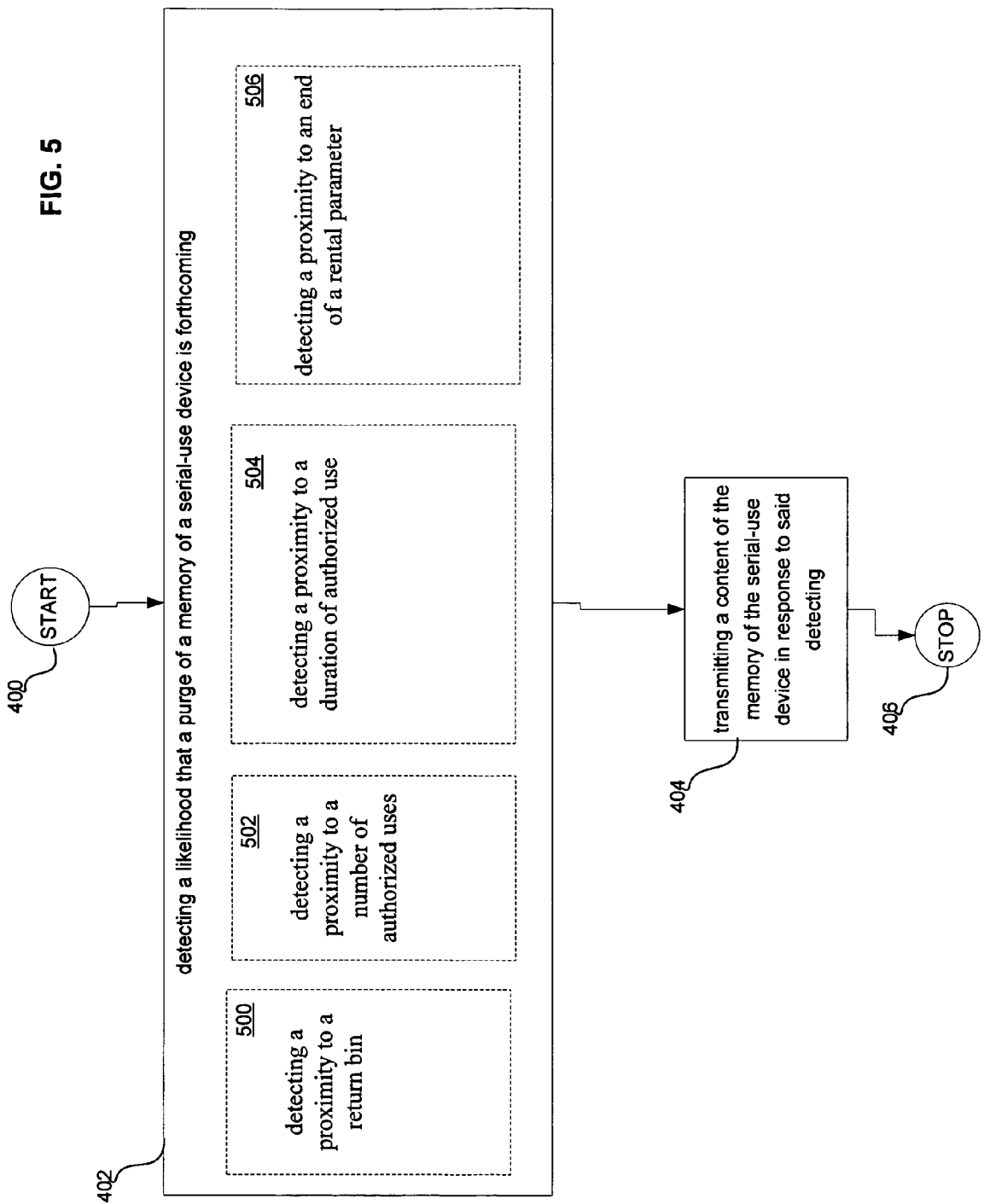
FIG. 5 shows a high-level logic flowchart depicting alternate implementations of the high-level logic flowchart of FIG. 4.

With reference now to FIG. 5, shown is a high-level logic flowchart depicting alternate implementations of the high-level logic flowchart of FIG. 4. Depicted is that in various alternate implementations, method step 402 includes method step 500, and/or method step 502, and/or method step 504, and/or method step 506. Method step 500 shows detecting a proximity to a return bin (e.g., via upcoming-purge detection logic 102 communicating with a beacon in the return bin, such as might be used at a rental concern). Method step 502 depicts detecting a proximity to a number of authorized uses (e.g., detecting that a number of authorized uses have been or are about to be performed via upcoming-purge detection logic 102 tracking a number of uses of serial-use device 100 and comparing such tracked number of uses against a known authorized number of uses). Method step 504 illustrates detecting a proximity to a duration of authorized use (e.g., detecting that a duration of authorized use has expired and/or will expire via upcoming-purge detection logic 102 tracking an elapsed time since serial-use device 100 left a rental facility and comparing such tracked elapsed time against a known authorized duration of time). Method step 506 illustrates detecting a proximity to an end of a rental parameter (e.g., detecting that one or more of any number of rental parameters are at or near their respective ends via upcoming-purge detection logic 102 tracking such one or more rental parameters in an appropriate fashion).

Figure 6:
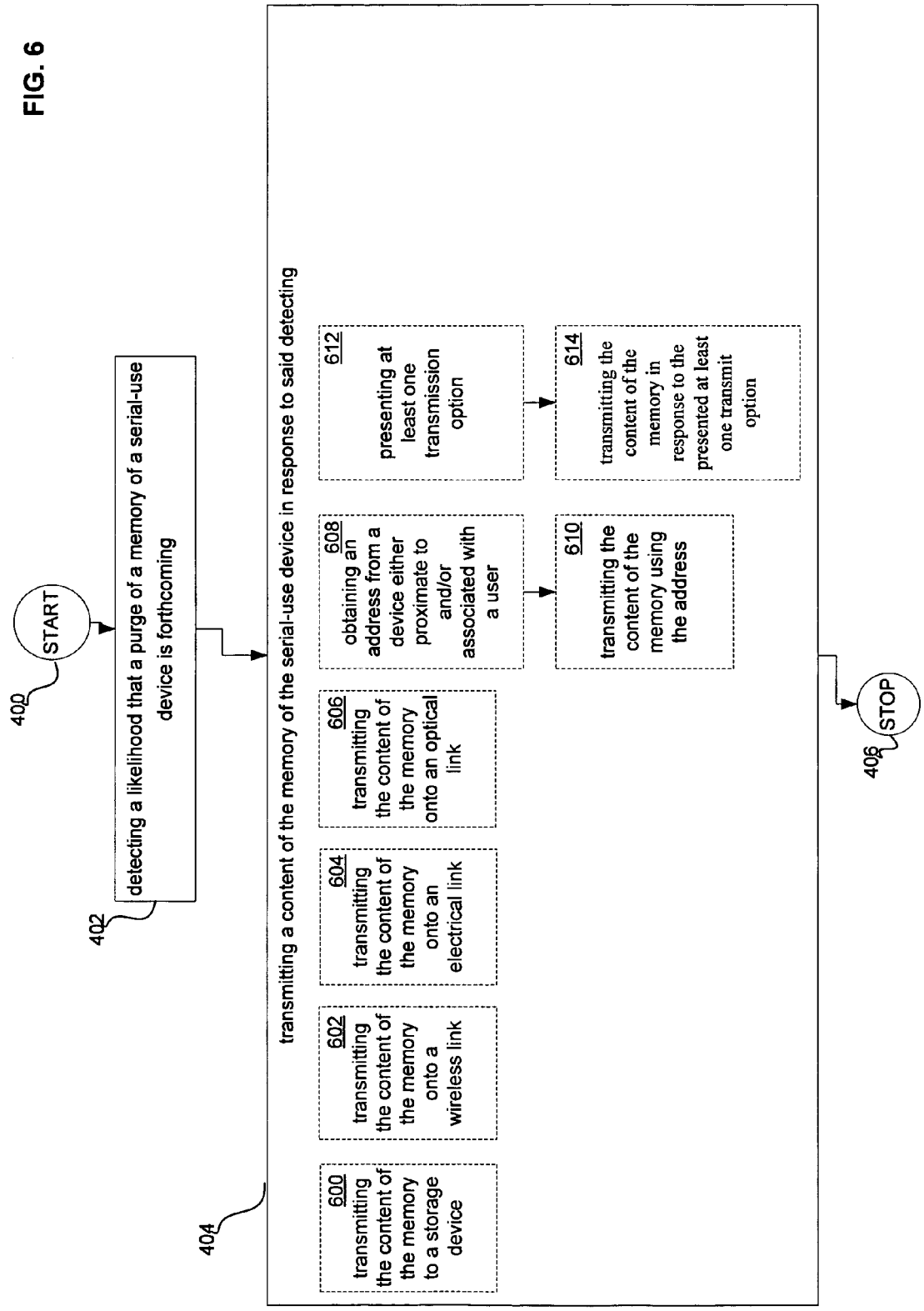
FIG. 6 depicts a high-level logic flowchart illustrating alternate implementations of the high-level logic flowchart of FIG. 4.

Referring now to FIG. 6, depicted is a high-level logic flowchart illustrating alternate implementations of the high-level logic flowchart of FIG. 4. Shown is that in various alternate implementations, method step 404 includes method step 600, and/or method step 602, and/or method step 604, and/or method step 606, and/or method steps 608-610, and/or methods step 612-614. Method step 600 depicts transmitting the content of the memory to a storage device (e.g., via preservation logic 106 transmitting all or part of the contents of memory device logic 104 to a storage device such as a EEPROM, a flash memory device, a rotating medium device (e.g., a magnetic disc drive and/or an optical disc drive), and/or a network storage device, etc.). Method step 602 illustrates transmitting the content of the memory onto a wireless link (e.g., via preservation logic 106 transmitting all or part of the contents of memory device logic 104 to a storage device through a wireless network such as an ad-hoc wireless network, and/or a cellular wireless network, and/or a point to point wireless link, etc.). Method step 604 illustrates transmitting the content of the memory onto an electrical link (e.g., via preservation logic 106 transmitting all or part of the contents of memory device logic 104 to a storage device through a serial and/or parallel electrical connection such as those used to interface with a flash external drive, a rotating media drive, a micro-disc drive, a random access memory, an EEPROM memory, etc). Method step 606 shows transmitting the content of the memory onto an optical link (e.g., via preservation logic 106 transmitting all or part of the contents of memory device logic 104 to a storage device through a serial and/or parallel optical connection such as those used by fiber-optic networks and or those used in point-to-point optical connections, etc). Method step 608 depicts obtaining an address from a device either proximate to and/or associated with a user (e.g., via preservation logic 106 communicating with a personal device associated with a human user, such as a Radio Frequency Identification (RFID) dog tag, a swinging Bluetooth medallion, a wristwatch, an input mechanism of serial use device 100 (e.g., button, keyboard input, voice input, etc.), etc. and obtaining an address such as a network, world wide web, and/or other appropriate type address, etc from the personal device). Method step 610 illustrates transmitting the content of the memory using the address (e.g., via preservation logic 106 transmitting via ways described/illustrated elsewhere herein and/or over a personal area network (PAN) using some appropriate technology such as ultra wide band (UWB)). Method step 612 shows presenting at least one transmission option (e.g., via preservation logic 106 presenting to the user one or more transmission options (e.g., to transmit all or only a part of the content of the memory, such as, for example, only a select digital photograph, and/or digital video, and/or digital audio) through a device accessible by a human/robotic user, such as a Radio Frequency Identification (RFID) dog tag, a swinging Bluetooth medallion, a wristwatch, a presentation mechanism of serial use device 100 (e.g., liquid crystal display, text output, voice output, etc.), etc.). Method step 614 depicts transmitting the content of the memory in response to the presented at least one transmit option (e.g., via preservation logic 106 transmitting the selected content via ways described/illustrated elsewhere herein and/or over a personal area network (PAN) using some appropriate technology such as ultra wide band (UWB)).

With reference now to FIG. 7, illustrated is a high-level block diagram of one implementation of preservation logic 106 transmitting all or part of a content of memory device logic 104 to serial-use device content reception logic 700. The large arrow shown between preservation logic 106 and serial-use device content reception logic 700 will be recognized by those having skill in the art as indicative of appropriate communications coupling technologies. For example, in one specific implementation preservation logic 106 communicates over an electrical coupling such as those provided by a parallel and/or a serial port electrical connection. In another specific implementation, preservation logic 106 communicates over an optical coupling such as that provided by a fiber optic cable, a point to point optical channel, an optical network, etc. In another specific implementation, preservation logic 106 communicates over a wireless coupling such as that provided by a cellular communications network, a point to point wireless channel, etc.

Continuing to refer to FIG. 7, further shown is that serial-use device content reception logic 700 transmits the received content to storage medium device 702. The large arrow shown between serial-use device content reception logic 700 and storage medium device 702 will be recognized by those having skill in the art as indicative of appropriate communications coupling technologies. For example, in one specific implementation serial-use device content reception logic 700 communicates over an electrical coupling such as may be provided by a parallel and/or a serial port electrical connection. In another specific implementation, serial-use device content reception logic 700 communicates over an optical coupling such as may be provided by a fiber optic cable, a point to point optical channel, an optical network, etc. In another specific implementation, serial-use device content reception logic 700 communicates over a wireless coupling such as that provided by a cellular communications network, a point to point wireless channel, etc. In some implementations preservation logic 106 and/or serial-use device content reception logic 700 are at least partially formed with integrated circuits. In some implementations storage medium device 702 may include a moving medium, such as a microdisc drive, a standard hard disk drive, an optical disk drive, etc. In some implementations storage medium device 702 may include a non-moving medium, such as a flash external drive, various types of random access memory (e.g., standard RAM, SRAM, DRAM, etc.), read only memory (e.g., ROM, EPROM, EEPROM, programmable gate arrays, etc.)

Figure 8:
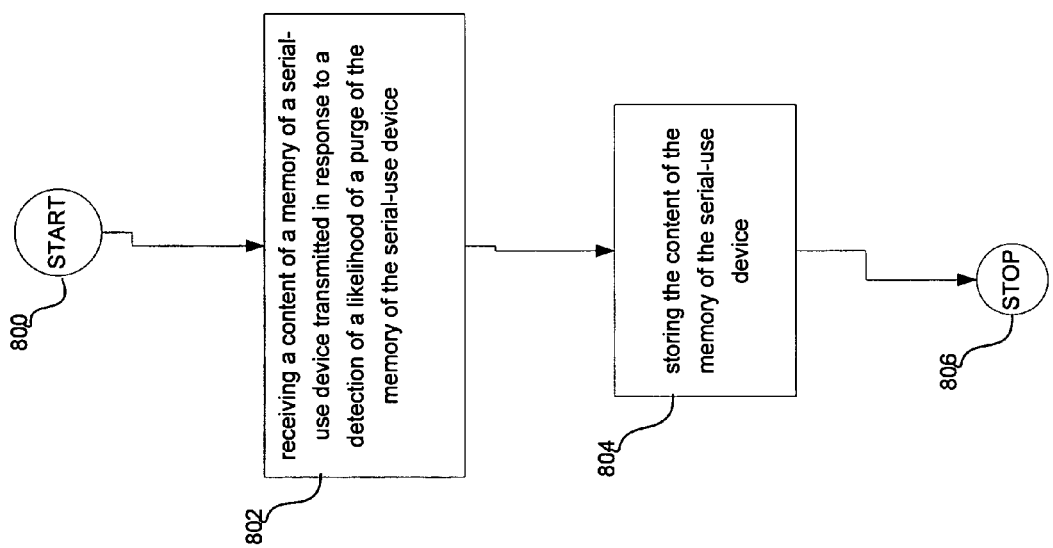
FIG. 8 illustrates a high-level logic flowchart of a process. Method step 800 shows the start of the process.

With reference now to FIG. 8, illustrated is a high-level logic flowchart of a process. Method step 800 shows the start of the process. Method step 802 shows receiving a content of a memory of a serial-use device transmitted in response to a detection of a likelihood of a purge of the memory of the serial-use device (e.g., via upcoming-purge detection logic 102 and/or its supporting components). Method step 804 depicts storing the content of the memory of the serial-use device (e.g., via preservation logic 106). Method step 806 shows the end of the process.

Figure 9:
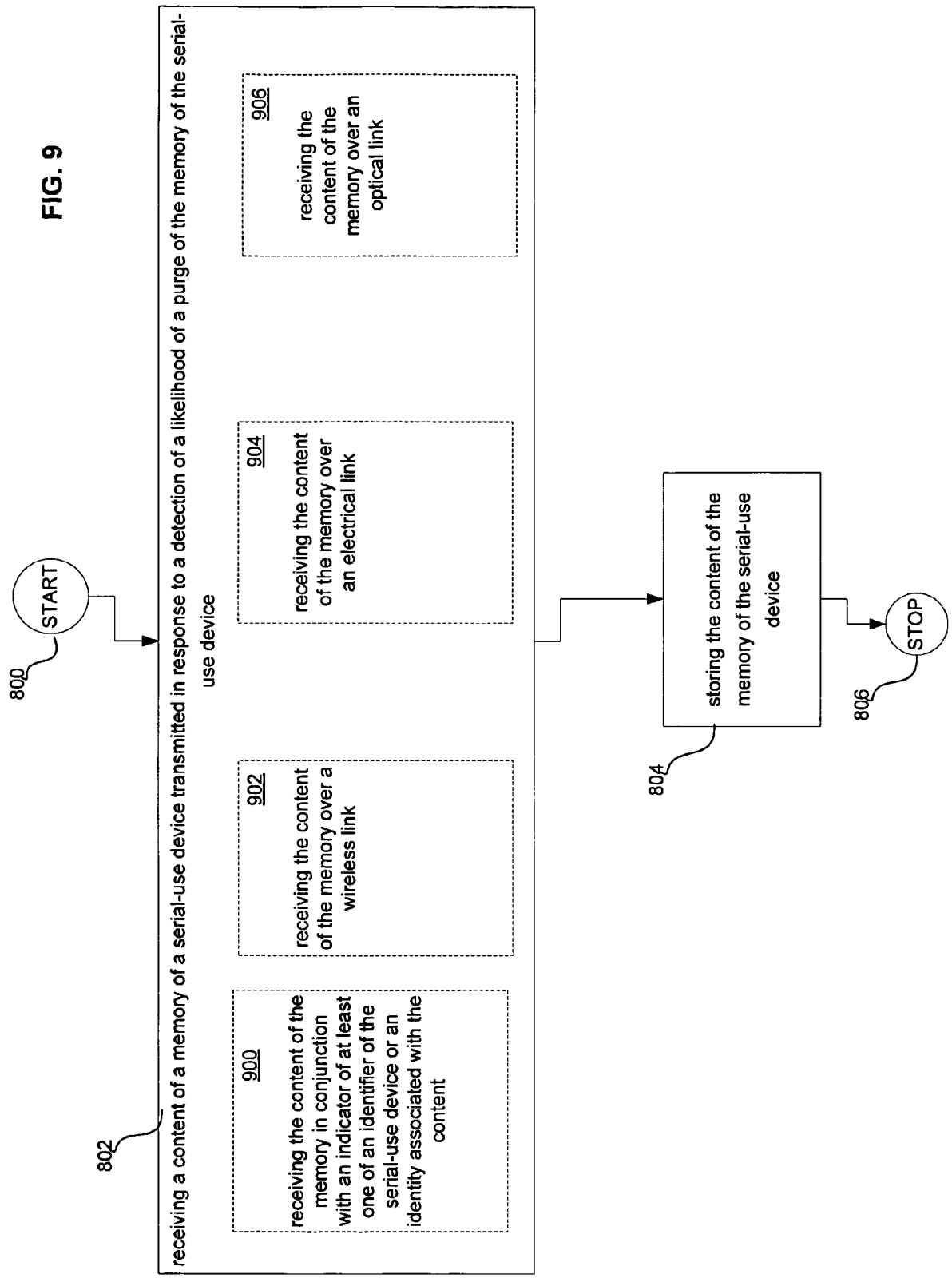
FIG. 9 shows a high-level logic flowchart depicting alternate implementations of the high-level logic flowchart of FIG. 8.

Referring now to FIG. 9, shown is a high-level logic flowchart depicting alternate implementations of the high-level logic flowchart of FIG. 8. Depicted is that in various alternate implementations, method step 802 includes method step 900, and/or method step 902, and/or method step 904, and/or method step 906. Method step 900 shows receiving the content of the memory in conjunction with an indicator of at least one of an identifier of the serial-use device or an identity associated with the content (e.g., via serial-use device content reception logic 700 receiving the content of preservation logic 106 in conjunction with an identifier of serial-use device 100 and/or the user of serial-use device 100). Method step 902 depicts receiving the content of the memory over a wireless link (e.g., via serial-use device content reception logic 100 receiving the content through a wireless network/or a point to point wireless link connection with preservation logic 106). Method step 904 illustrates receiving the content of the memory over an electrical link (e.g., via serial-use device content reception logic 700 receiving content over a serial and/or a parallel wired connection with preservation logic 106). Method step 906 shows receiving the content of the memory over an optical link (e.g., via serial-use device content reception logic 700 receiving content over a serial and/or a parallel optical connection with preservation logic 106).

Figure 10:
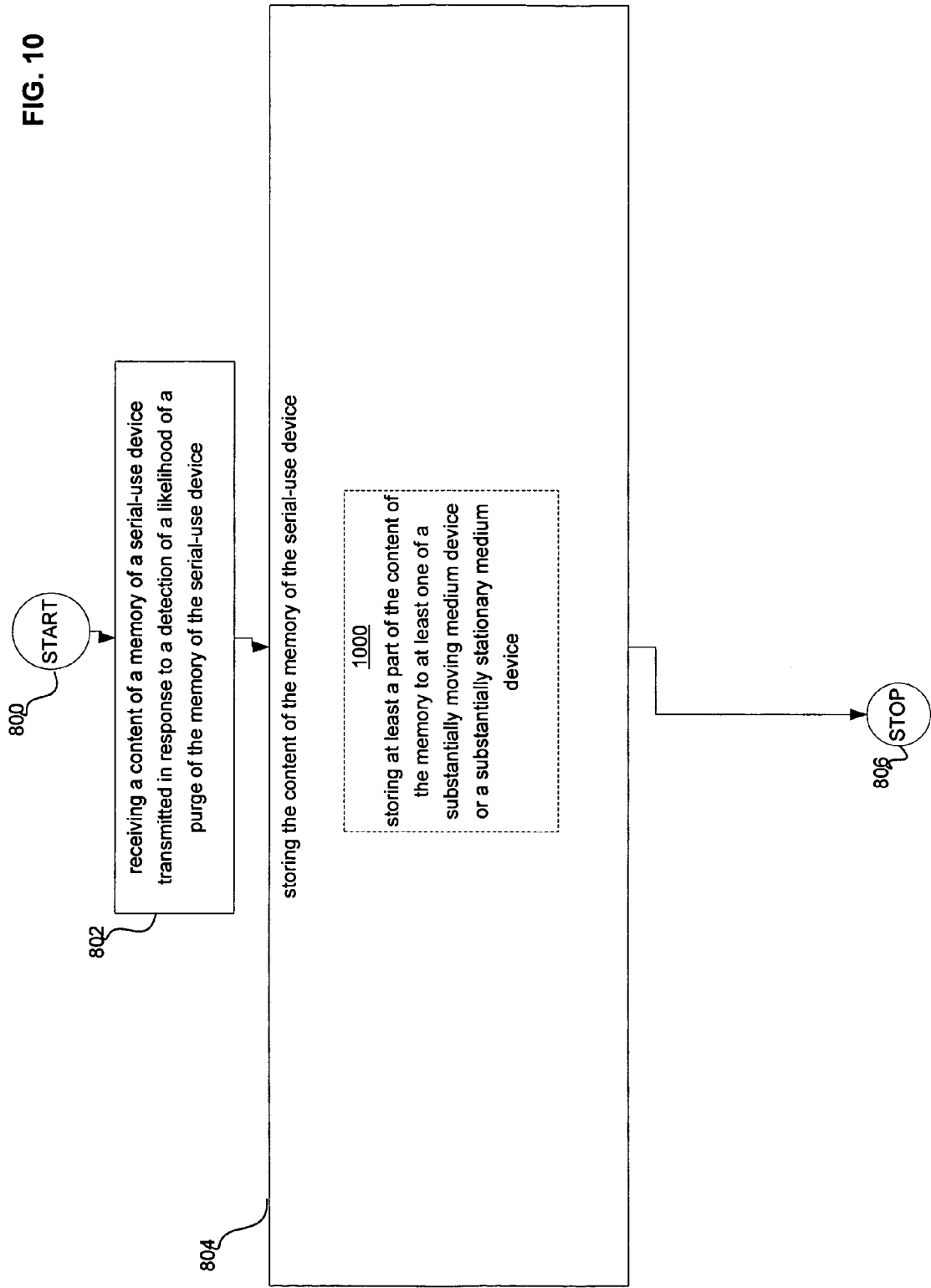
FIG. 10 depicts a high-level logic flowchart illustrating alternate implementations of the high-level logic flowchart of FIG. 8.

Referring now to FIG. 10, depicted is a high-level logic flowchart illustrating alternate implementations of the high-level logic flowchart of FIG. 8. Shown is that in one or more various alternate implementations, method step 804 includes method step 1000. Method step 1000 depicts storing at least a part of the content of the memory to at least one of a substantially moving medium device or a substantially stationary medium device (e.g., via serial-use device content reception logic 700 transmitting all or part of the content and/or indicator to storage medium device 702 that may entail a substantially moving device such as an appropriate rotating medium drive and/or a substantially non moving—or substantially stationary—device such as an EEPROM, a flash memory device, RAM, ROM, programmable gate array, etc.)

With reference now to FIG. 11, illustrated is a high-level block diagram of one implementation of preservation logic 106 retrieving all or part of a content of memory device logic 104 from storage medium device 702 through content recall and transmit logic 1100. The large arrows shown between preservation logic 106, content recall and transmit logic 1100, and storage medium device 702 will be recognized by those having skill in the art as indicative of appropriate communications coupling technologies. For example, in one specific implementation preservation logic 106 communicates over an electrical coupling such as those provided by a parallel and/or a serial port electrical connection. In another specific implementation, preservation logic 106 communicates over an optical coupling such as that provided by a fiber optic cable, a point to point optical channel, an optical network, etc. In another specific implementation, preservation logic 106 communicates over a wireless coupling such as that provided by a cellular communications network, a point to point wireless channel, etc.

Continuing to refer to FIG. 11, further shown is that content recall and transmit logic 1100 retrieves a previously received content from storage medium device 702 (e.g., as in helping perform an undo operation as described herein). The large arrow shown between content recall and transmit logic 1100 and storage medium device 702 will be recognized by those having skill in the art as indicative of appropriate communications coupling technologies. For example, in one specific implementation content recall and transmit logic 1100 communicates over an electrical coupling such as may be provided by a parallel and/or a serial port electrical connection. In another specific implementation, content recall and transmit logic 1100 communicates over an optical coupling such as may be provided by a fiber optic cable, a point to point optical channel, an optical network, etc. In another specific implementation, content recall and transmit logic 1100 communicates over a wireless coupling such as that provided by a cellular communications network, a point to point wireless channel, etc. In some implementations preservation logic 106 and/or content recall and transmit logic 1100 are at least partially formed with integrated circuits. In some implementations storage medium device 702 may include a moving medium, such as a micro-disc drive, a standard hard disk drive, an optical disk drive, etc. In some implementations storage medium device 702 may include a non-moving medium, such as a flash external drive, various types of random access memory (e.g., standard RAM, SRAM, DRAM, etc.), read only memory (e.g., ROM, EPROM, EEPROM, programmable gate arrays, etc.)

With reference now to FIG. 12, shown is a high-level logic flowchart illustrating at least one alternate implementation of the high-level logic flowchart of FIG. 4. Shown is that in at least one alternate implementation, the process of FIG. 4 includes method step 405. Method step 405 depicts retrieving at least a part of the transmitted content using an address (e.g., via preservation logic 106 retrieving all or part of the contents of memory device logic 104 from a storage device such as a EEPROM, a flash memory device, a rotating medium device (e.g., a magnetic disc drive and/or an optical disc drive), and/or a network storage device, etc.)—the inventors point out that the retrieved content can entail retrieving a transformed version of the transmitted content, such as a token. The remaining method steps of FIG. 12 function analogously to similar steps shown/described elsewhere herein.

Referring now to FIG. 13, depicted is a high-level logic flowchart illustrating alternate implementations of the high-level logic flowchart of FIG. 12. Shown is that in one or more various alternate implementations, method step 405 includes method steps 1300-1302 and/or method steps 1304-1306. Method step 1300 illustrates accepting an undo input (e.g., via preservation logic 106 receiving such input through a personal device associated with a human user, such as a Radio Frequency Identification (RFID) dog tag, a swinging Bluetooth medallion, a wristwatch, an input mechanism of serial use device 100 (e.g., button, keyboard input, voice input, etc.). Method step 1302 shows retrieving at least a part of the transmitted content in response to the accepted undo input (e.g., preservation logic 106 retrieving at least a part of previously transmitted content from storage medium device 702 through content recall and transmit logic 1100).

Continuing to refer to FIG. 13, method step 1304 illustrates accepting a re-rent input (e.g., via preservation logic 106 receiving such input through a personal device associated with a human user, such as a Radio Frequency Identification (RFID) dog tag, a swinging Bluetooth medallion, a wristwatch, an input mechanism of serial use device 100 (e.g., button, keyboard input, voice input, etc.). Method step 1306 shows retrieving at least a part of the transmitted content in response to the accepted re-rent input (e.g., preservation logic 106 retrieving at least a part of previously transmitted content from storage medium device 702 through content recall and transmit logic 1100).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The invention claimed is:

1. A method comprising:
   detecting a likelihood that a purge of a memory of a serial-use device is forthcoming; and
   transmitting a content of the memory of the serial-use device in response to said detecting; and
   retrieving at least a part of the transmitted content of the memory using an address;
   wherein said retrieving at least a part of the transmitted content of the memory using an address further comprises:
   accepting a re-rent input; and
   retrieving at least a part of the transmitted content of the memory in response to the accepted re-rent input.

2. The method of claim 1, wherein said detecting a likelihood that a purge of a memory of a serial-use device is forthcoming further comprises: detecting a proximity to a return bin.

3. The method of claim 1, wherein said detecting a likelihood that a purge of a memory of a serial-use device is forthcoming further comprises: detecting a proximity to a number of authorized uses.

4. The method of claim 1, wherein said detecting a likelihood that a purge of a memory of a serial-use device is forthcoming further comprises: detecting a proximity to a duration of authorized use.

5. The method of claim 1, wherein said detecting a likelihood that a purge of a memory of a serial-use device is forthcoming further comprises: detecting a proximity to an end of a rental parameter.

6. The method of claim 1, wherein said transmitting a content of the memory of the serial-use device in response to said detecting further comprises: transmitting the content of the memory to a storage device.

7. The method of claim 1, wherein said transmitting a content of the memory of the serial-use device in response to said detecting further comprises: transmitting the content of the memory onto a wireless link.

8. The method of claim 1, wherein said transmitting a content of the memory of the serial-use device in response to said detecting further comprises: transmitting the content of the memory onto an electrical link.

9. The method of claim 1, wherein said transmitting a content of the memory of the serial-use device in response to said detecting further comprises: transmitting the content of the memory onto an optical link.

10. The method of claim 1, wherein said transmitting a content of the memory of the serial-use device in response to said detecting further comprises: obtaining an address from a device proximate to and/or associated with a user; and transmitting at least a part of the content of the memory using the address.

11. The method of claim 1, wherein said transmitting a content of the memory of the serial-use device in response to said detecting further comprises: presenting at least one transmission option; and transmitting at least a part of the content of the memory in response to a selection from the presented at least one transmit option.

12. A method comprising:
    detecting a likelihood that a purge of a memory of a serial-use device is forthcoming;
    transmitting a content of the memory of the serial-use device in response to said detecting; and
    retrieving at least a part of the transmitted content of the memory using an address;
wherein said retrieving at least a part of the transmitted content of the memory using an address further comprises:
    accepting an undo input; and
    retrieving at least a part of the transmitted content of the memory in response to the accepted undo input.

13. A system comprising:
    means for detecting a likelihood that a purge of a memory of a serial-use device is forthcoming;
    means for transmitting a content of the memory of the serial-use device in response to said detecting; and
    means for retrieving at least a part of the transmitted content of the memory using an address;
wherein said means for retrieving at least a part of the transmitted content of the memory using an address further comprises:
    means for accepting a re-rent input; and
    means for retrieving at least a part of the transmitted content of the memory in response to the accepted re-rent input.

14. The system of claim 13, wherein said means for detecting a likelihood that a purge of a memory of a serial-use device is forthcoming further comprises: means for detecting a proximity to a return bin.

15. The system of claim 13, wherein said means for detecting a likelihood that a purge of a memory of a serial-use device is forthcoming further comprises: means for detecting a proximity to a number of authorized uses.

16. The system of claim 13, wherein said means for detecting a likelihood that a purge of a memory of a serial-use device is forthcoming further comprises: means for detecting a proximity to a duration of authorized use.

17. The system of claim 13, wherein said means for detecting a likelihood that a purge of a memory of a serial-use device is forthcoming further comprises: means for detecting a proximity to an end of a rental parameter.

18. The system of claim 13, wherein said means for transmitting a content of the memory of the serial-use device in response to said detecting further comprises: means for transmitting the content of the memory to a storage device.

19. The system of claim 13, wherein said means for transmitting a content of the memory of the serial-use device in response to said detecting further comprises: means for transmitting the content of the memory onto a wireless link.

20. The system of claim 13, wherein said means for transmitting a content of the memory of the serial-use device in response to said detecting further comprises: means for transmitting the content of the memory onto an electrical link.

21. The system of claim 13, wherein said means for transmitting a content of the memory of the serial-use device in response to said detecting further comprises: means for transmitting the content of the memory onto an optical link.

22. The system of claim 13, wherein said means for transmitting a content of the memory of the serial-use device in response to said detecting further comprises: means for obtaining an address from a device proximate to and/or associated with a user; and means for transmitting at least a part of the content of the memory using the address.

23. The system of claim 13, wherein said means for transmitting a content of the memory of the serial-use device in response to said detecting further comprises: means for presenting at least one transmission option; and means for transmitting at least a part of the content of the memory in response to a selection from the presented at least one transmit option.

24. A system comprising:
    means for detecting a likelihood that a purge of a memory of a serial-use device is forthcoming;
    means for transmitting a content of the memory of the serial-use device in response to said detecting; and
    means for retrieving at least a part of the transmitted content of the memory using an address;
wherein said means for retrieving at least a part of the transmitted content of the memory using an address further comprises:
    means for accepting an undo input; and
    means for retrieving at least a part of the transmitted content of the memory in response to the accepted undo input.

25. A system comprising:
    circuitry for detecting a likelihood that a purge of a memory of a serial-use device is forthcoming;
    circuitry for transmitting a content of the memory of the serial-use device in response to said detecting; and
    circuitry for retrieving at least a part of the transmitted content of the memory using an address, wherein the circuitry for retrieving at least a part of the transmitted content of the memory using an address further comprises:

circuitry for accepting an undo input; and circuitry for retrieving at least a part of the transmitted content of the memory in response to the accepted undo input.

26. A system comprising:

a serial-use device operably couplable with upcoming-purge detection logic; and preservation logic operably-couplable with a memory device of said serial-use device, wherein said serial-use device operably couplable with upcoming-purge detection logic further comprises:

said serial-use device optically couplable with said upcoming-purge detection logic.

27. A system comprising:

a serial-use device operably couplable with upcoming-purge detection logic; and preservation logic operably-couplable with a memory device of said serial-use device, wherein said serial-use device operably couplable with upcoming-purge detection logic further comprises:

said serial-use device wirelessly couplable with said upcoming-purge detection logic.

28. The system of claim 27, wherein said preservation logic operably-couplable with a memory device of said serial-use device further comprises:

the memory device of said serial-use device electrically couplable with said preservation logic.

29. The system of claim 27, wherein said preservation logic operably-couplable with a memory device of said serial-use device further comprises:

the memory device of said serial-use device optically couplable with said preservation logic.

30. The system of claim 27, wherein said preservation logic operably-couplable with a memory device of said serial-use device further comprises:

the memory device of said serial-use device wirelessly couplable with said preservation logic.

31. The system of claim 27, wherein said serial-use device further comprises:

at least one of a still image device, a motion image recordation device, a textual data device, or an audio device.

\* \* \* \* \*

UNITED STATES PATENT AND TRADEMARK OFFICE
CERTIFICATE OF CORRECTION

PATENT NO. : 7,441,089 B2
APPLICATION NO. : 10/973930
DATED : October 21, 2008
INVENTOR(S) : Edward K. Y. Jung et al.

It is certified that error appears in the above-identified patent and that said Letters Patent is hereby corrected as shown below:

In the Claims

Column 10, Line 53, Claim 1 - Please delete "and" after the ";"

Signed and Sealed this
Second Day of July, 2013

Teresa Stanek Rea
*Acting Director of the United States Patent and Trademark Office*